Dec. 20, 1966 W. LOHS 3,293,372

TELEPHONE SET

Filed Nov. 6, 1961 3 Sheets-Sheet 1

Dec. 20, 1966 W. LOHS 3,293,372

TELEPHONE SET

Filed Nov. 6, 1961 3 Sheets-Sheet 2

Dec. 20, 1966 W. LOHS 3,293,372

TELEPHONE SET

Filed Nov. 6, 1961 3 Sheets-Sheet 3

United States Patent Office 3,293,372
Patented Dec. 20, 1966

3,293,372
TELEPHONE SET
Willy Lohs, Munich, Germany, assignor to Siemens & Halske Aktiengesellschaft Berlin and Munich, a corporation of Germany
Filed Nov. 6, 1961, Ser. No. 150,403
Claims priority, application Germany, Nov. 24, 1960, S 71,393
7 Claims. (Cl. 179—100)

This invention is concerned with a telephone set comprising a housing containing a preferably plate-shaped insulating carrier provided with the interior wiring which is made, for example, in the form of a printed circuit.

The object of the invention is to simplify the construction of such a telephone set particularly insofar as the assembly and maintenance thereof are concerned.

This object is realized by arranging the insulating wiring plate for insertion into receiving means provided therefor within the housing.

The wiring plate can be secured in its assigned position in several ways. For example, the plate may be provided with stop means determining its position within the respective receiving means and holding it in such position. Other fastening means may be employed, for example, resilient bracket means or the like for holding the plate in its assigned position. The plate can however be mounted and secured in particularly advantageous manner by inserting it into receiving means provided within a first housing part, for example, the cover, and securing it in its inserted position by means of a second housing part, for example, the base plate of the housing. Elastic inserts are in such case advantageously provided between the respective housing part and the wiring plate. The securing of the wiring plate is in any case greatly simplified as compared with previously known arrangements.

The wiring plate may also be utilized to serve as a carrier for component elements of the telephone set, preferably for relatively light weight components such as the induction coil, capacitors and resistors, the terminals of which may be inserted through holes in the wiring plate for the soldering thereof to the wiring carried thereby.

Further details and features of the invention will appear from the description of an embodiment thereof which will be rendered below with reference to the accompanying drawings.

Inside of the top wall of the housing cover 1 are provided ribs 2 and 3 and complementary ribs 4, 5 and 6, 7 are provided on the inside of the side walls thereof, such ribs forming a channel, referred to as receiving means, for receiving the plate-shaped insulating carrier 8 provided with the interior wiring, briefly referred to as wiring plate.

Figure 1:
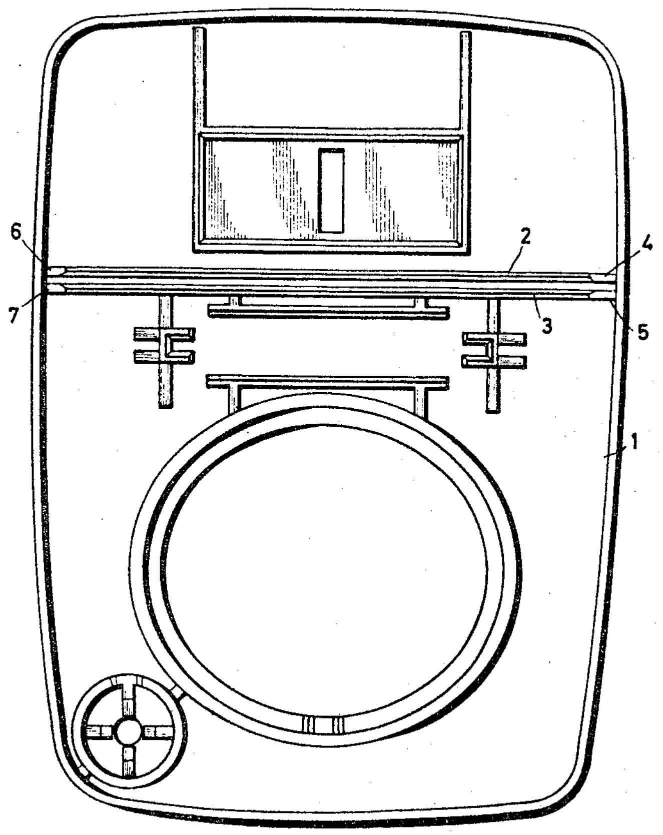
FIG. 1 shows the interior of the cover of the housing of a telephone set provided with receiving means for the insertion of the plate-like insulating carrier or wiring plate.
Figure 2:
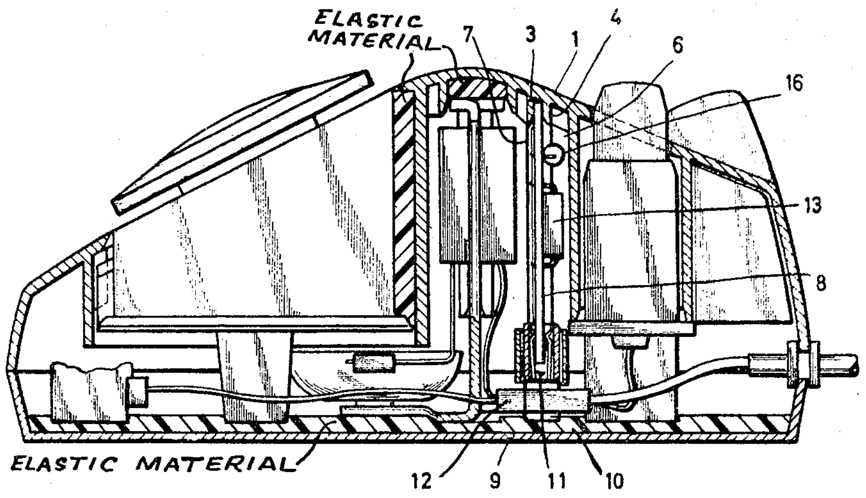
FIG. 2 represents a sectional view of the telephone set equipped with its component parts or elements, taken approximately on the line 2—2 of FIG. 3.
Figure 3:
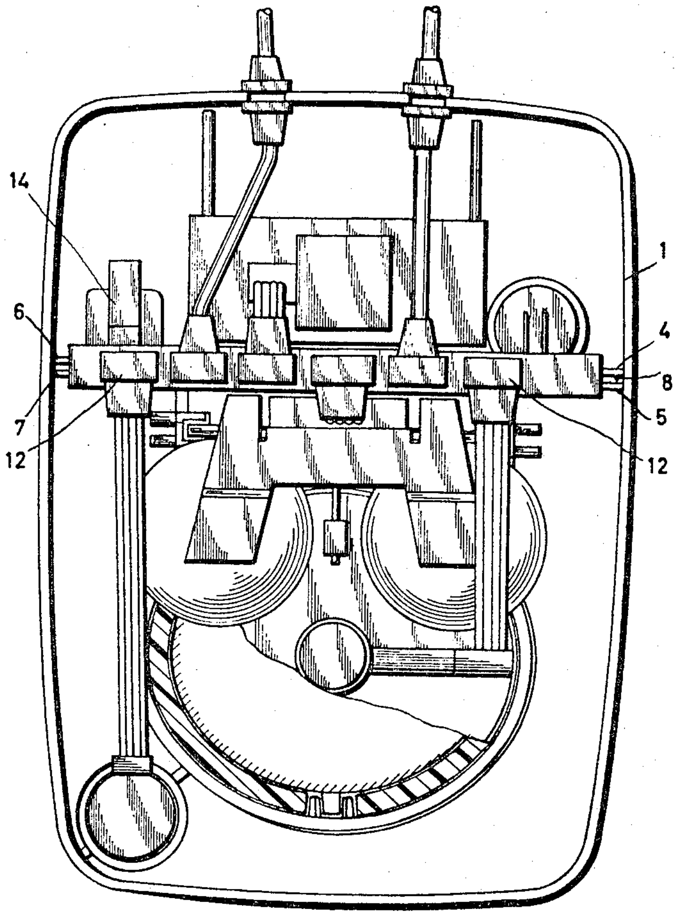
FIG. 3 shows the housing cover, illustrated in FIG. 1, with the component elements carried thereby, as seen from below.

The wiring plate 8 is inserted into the receiving means or channel as illustrated in FIGS. 2 and 3. The wiring plate 8 is held in its inserted position in the receiving means by the base plate 9 with interposition of an elastic insert or pad 10 disposed on the inside of the base plate coextensive therewith.

The wiring plate 8 also serves as a carrier for relatively light weight component elements of the telephone set, such as the resistors 13, 16, the induction coil 14 and a capacitor 15. The terminals of these component elements are extended through holes formed in the wiring plate for the soldering thereof to the wiring carried by the plate. It is understood, of course, that these component elements may be secured differently.

The lower edge of the wiring plate 8 which faces in the direction of the base plate 9 is provided with receiving means 11 for plug connectors 12 carrying respectively the terminal wires of the component elements and by the apparatus cord means of the telephone set. These terminal wires are accordingly connected with the wiring upon plugging the respective plugs into position in the corresponding receiving means at the lower edge of the wiring plate 8. The respective plugs or connector means are upon assembly of the base plate 9 with the housing cover 1, clamped in assigned position between the lower edge of the wiring plate 8 and the elastic pad 10 extending over the inside wall of the base plate.

Accordingly, no particular fastening means are required for securing the wiring plate in its assigned position. The plugs or connector means are in this arrangement definitely secured against inadvertent displacement.

The remaining component elements are, in the illustrated embodiment of the invention, by the clamping action of the base plate 9, likewise held in the receiving means provided therefor in the housing cover. It is of course possible to secure these remaining component elements in different manner. It is within the scope of the invention likewise possible to secure the wiring plate in its position within the receiving means provided in the corresponding housing part, by other suitable holding means. The invention is accordingly not inherently limited to the exact details described in the foregoing and illustrated in the drawings.

Changes may be made within the scope and spirit of the appended claims which define what is believed to be new and desired to have protected by Letters Patent.

I claim:

1. A telephone set comprising a cover and a base plate forming parts of a housing, a preferably plate-shaped insulating carrier provided with the interior wiring of the telephone set, and means within the housing including flanges forming channels for receiving and disposing said wiring plate in position by sliding insertion thereof into said receiving means.

2. A telephone set according to claim 1, wherein said receiving means is arranged in one part of the housing, said wiring plate being after insertion thereof into the receiving means secured in inserted position by another part of said housing.

3. A telephone set according to claim 1, wherein said receiving means is arranged in one part of the housing, said wiring plate being after insertion thereof into the receiving means secured in inserted position by another part of said housing, and elastic insert means disposed between the wiring plate and said other housing part.

4. A telephone set according to claim 1, wherein said receiving means is provided in the cover of said housing, said wiring plate being after insertion thereof into said receiving means secured in inserted position by the base plate of said housing.

5. A telephone set according to claim 1, wherein said receiving means is provided in the cover of said housing, said wiring plate being after insertion thereof into said receiving means secured in inserted position by the base plate of said housing, and elastic insert means disposed between the wiring plate and said base plate.

6. A telephone set according to claim 1, wherein said wiring plate also serves as a carrier for relatively light weight components including induction coil, capacitors and resistors.

7. A telephone set according to claim 1, wherein said flanges are positioned perpendicular to the base plate for mounting said wiring plate in perpendicular relation to the base plate.

References Cited by the Examiner

UNITED STATES PATENTS

| | | | |
|---|---|---|---|
| 2,548,723 | 4/1951 | Houdek | 179—100 |
| 2,692,305 | 10/1954 | Mullin | 317—101 |
| 2,718,563 | 9/1955 | Nicholides | 179—179 X |

| | | | |
|---|---|---|---|
| 2,894,077 | 7/1959 | McCoy | 317—101 |
| 2,951,909 | 9/1960 | Bauman | 179—84 |

OTHER REFERENCES

Telephony, Dec. 19, 1959; vol. 157, No. 25; pages 30 and 31.

North Electric Ericofon Handbook, North Electric Company, Galion, Ohio, reprint of Oct. 1, 1963.

KATHLEEN H. CLAFFY, *Primary Examiner.*

THOMAS B. HABECKER, *Examiner.*

W. C. COOPER, *Assistant Examiner.*